United States Patent
Baba et al.

(10) Patent No.: US 7,480,272 B2
(45) Date of Patent: Jan. 20, 2009

(54) SOFT HANDOFF IN IP-BASED CDMA NETWORKS BY IP ENCAPSULATION

(75) Inventors: Shinichi Baba, Morristown, NJ (US);
Tadahiko Maeda, Summit, NJ (US);
Tao Zhang, Fort Lee, NJ (US);
Prathima Agrawal, New Providence, NJ (US)

(73) Assignees: Toshiba America Research, Inc, Morristown, NJ (US); Telcordia Technologies, Inc, Morristown, NJ (US)

( * ) Notice: Subject to any disclaimer, the term of this patent is extended or adjusted under 35 U.S.C. 154(b) by 1405 days.

(21) Appl. No.: 09/822,822

(22) Filed: Apr. 2, 2001

(65) Prior Publication Data

US 2002/0141360 A1    Oct. 3, 2002

(51) Int. Cl.
*H04J 1/16* (2006.01)
*H04J 3/14* (2006.01)
*H04L 12/26* (2006.01)

(52) U.S. Cl. .................................................. 370/331

(58) Field of Classification Search ............... 370/313, 370/352, 475, 330–332, 338, 392, 405, 238, 370/356, 389–401, 351, 466, 465, 476, 328, 370/349, 329, 335, 350; 455/433–445, 522, 455/428, 500, 422.1, 432, 406, 417, 466, 455/446, 422, 69, 560, 517; 709/245, 238, 709/229, 230, 223, 222; 375/130, 135, 136, 375/140, 141, 225
See application file for complete search history.

(56) References Cited

U.S. PATENT DOCUMENTS

| | | | | |
|---|---|---|---|---|
| 5,251,205 A * | 10/1993 | Callon et al. | ............. | 370/392 |
| 5,325,362 A * | 6/1994 | Aziz | ............. | 370/405 |
| 5,434,853 A * | 7/1995 | Hemmady et al. | ............. | 370/331 |
| 5,438,565 A * | 8/1995 | Hemmady et al. | ............. | 370/335 |
| 6,088,335 A * | 7/2000 | I et al. | ............. | 370/252 |
| 6,108,547 A * | 8/2000 | Yamashita et al. | ............. | 455/442 |
| 6,366,561 B1 * | 4/2002 | Bender | ............. | 370/238 |
| 6,452,920 B1 * | 9/2002 | Comstock | ............. | 370/349 |
| 6,496,505 B2 * | 12/2002 | La Porta et al. | ............. | 370/392 |
| 6,512,754 B2 * | 1/2003 | Feder et al. | ............. | 370/338 |
| 6,515,974 B1 * | 2/2003 | Inoue et al. | ............. | 370/331 |
| 6,526,033 B1 * | 2/2003 | Wang et al. | ............. | 370/338 |
| 6,535,493 B1 * | 3/2003 | Lee et al. | ............. | 370/329 |
| 6,636,498 B1 * | 10/2003 | Leung | ............. | 370/338 |

(Continued)

OTHER PUBLICATIONS

Matalgah, M.M; ATM evolution in wireless communication network infrastructure, Wireless Communications and Networking Conference, 2000, vol. 3, Sep. 23-28, 2000, pp. 1042-1045.*

(Continued)

*Primary Examiner*—Wing F Chan
*Assistant Examiner*—Prenell P Jones
(74) *Attorney, Agent, or Firm*—Banner & Witcoff, Ltd

(57) ABSTRACT

For IP-based wireless systems in which base stations are connected by an IP network and communication among base stations is not controlled by the centralized management, a new system and method for realizing soft handoff by using encapsulation in order to distribute and gather a reproduced packet by the serving base station with other base stations and to transfer the serving role between the base stations as the mobile station moves is described.

33 Claims, 10 Drawing Sheets

U.S. PATENT DOCUMENTS

| | | | |
|---|---|---|---|
| 6,643,287 B1* | 11/2003 | Callon et al. | 370/392 |
| 6,765,896 B1* | 7/2004 | Ahmed et al. | 370/338 |
| 6,765,921 B1* | 7/2004 | Stacey et al. | 370/401 |
| 6,856,624 B2* | 2/2005 | Magret | 370/392 |
| 6,862,457 B1* | 3/2005 | Sarkar et al. | 455/522 |
| 6,907,017 B2* | 6/2005 | Reddy et al. | 370/331 |
| 6,993,021 B1* | 1/2006 | Chuah et al. | 370/389 |
| 6,999,434 B1* | 2/2006 | Agrawal et al. | 370/331 |
| 2002/0026527 A1* | 2/2002 | Das et al. | 709/245 |
| 2002/0054584 A1* | 5/2002 | Dempo | 370/338 |
| 2002/0057657 A1* | 5/2002 | La Porta et al. | 370/331 |
| 2002/0094013 A1* | 7/2002 | Schilling et al. | 375/130 |
| 2002/0181437 A1* | 12/2002 | Ohkubo et al. | 370/349 |
| 2002/0191558 A1* | 12/2002 | Agrawal et al. | 370/329 |
| 2004/0125795 A1* | 7/2004 | Corson et al. | 370/356 |

OTHER PUBLICATIONS

Yon-i Km et al; Mobility management and routing algorithms for sotf handoffs in wireless mobile data network using MGCP, Vehicular Technology Conference, 2000. IEEE VTS-Fall VTS 2000. 52nd, vol. 2, pp. 924-928.*

Uwe Herzog et al, UMTS Network Aspects/Guidelines for the development of future UMTS architectures, EURESCOM; EDIN 0081-0920, Jan. 2001, pp. 1-33, Internet printout: http://www.eurescom.de/~pub-deliverables/P900-series/P920/D3/p920d3.pdf.*

Jyh-Cheng Chen et al; Fast link layer and intra-domain handoffs for mobile Internet, Computer Software and Applications Conference, 2000. COMPSAC 2000. The Annual International, Oct. 25-27, 2000, pp. 325-330.*

John Ioannidis, Dan Duchamp, Gerald Q. Maguire; Aug. 1991, ACM SIGCOMM Computer Communication Review, Proceedings of the conference on Communications architecture & protocols, vol. 21 Issue 4.*

Woo, W.; Leung, V.C.M.; Handoff enhancement in mobile-ip environment Universal Personal Communications; 1996. Record., 1996 5th IEEE International Conference on vol. 2, Sep. 29-Oct. 2, 1996 pp. 760-764.*

Perkins, C.E.; Kuang-Yeh Wang; Optimized smooth handoffs in Mobile IP Computers and Communications, 1999. Proceedings. IEEE International Symposium on Jul. 6-8, 1999 pp. 340-346.*

Aziz, Ashar; A Scalable and Efficient Intra-Domain Tunneling Mobile -IP Scheme, Aug. 11, 1993, ACM SIGCOMM, vol. 24, Issue 1, pp. 12-20.*

Krishanu Seal, Suresh Singh; Loss profiles: A quality of service measure in mobile computing; Mar. 1996, Wireless Networks, Kluwer Academic Press; vol. 2 Issue 1: p. 45-61.*

Internet printout: http://rfc.sunsite.dk/rfc/rfc1134.html, "Point-to-Point Protocol: A Proposal for Multi-Protocol Transmission of Datagrams Over Point-to-Point Links", dated Apr. 23, 2004.

3$^{rd}$ Generation Partnership Project 2 "3GPP2", "Data Service Options for Spread Spectrum Systems: cdma2000 High Speed Packet Data Service Option 33", Version 2.0, dated Aug. 21, 2000.

Internet printout: http://rfc.sunsite.dk/rfc/rfc768.html, User Datagram Protocol, dated Apr. 23, 2004.

Internet printout: http://rfc.sunsite.dk/rfc/rfc793.html, "Transmission Control Protocol DARPA Internet Program Protocol Specification", dated Apr. 23, 2004.

Internet printout: http://rfc.sunsite.dk/rfc/rfc2003.html, "IP Encapsulation within IP", dated Apr. 23, 2004.

Internet printout: http://rfc.sunsite.dk/rfc/rfc768.html, User Datagram Protocol, dated Apr. 23, 2004.

Internet printout: http://rfc.sunsite.dk/rfc/rfc2004.html, "Minimal Encapsulation within IP", dated Apr. 23, 2004.

Internet printout: http://rfc.sunsite.dk/rfc/rfc2784.html, "Generic Routing Encapsulation (GRE)", dated Apr. 23, 2004.

K. Elsayed et al. "MPLS: The Magic Behind the Myths", IEEE Communications Magazine, Jan. 2000.

Internet printout: http://rfc.sunsite.dk/rfc/rfc2002.html, "IP Mobility Support", dated Apr. 23, 2004.

Ramjee et al., "IP-Based Access Network Infrastructure for Next-Generation Wireless Data Networks", IEEE Personal Communications, Aug. 2000.

Campbell et al., "Design, Implementation, and Evaluation of Cellular IP", IEEE Personal Communications, Aug. 2000.

3$^{rd}$ Generation Partnership Project 2 "3GPP2", "Data Service Options for Spread Spectrum Systems", Version 2.0, dated Aug. 21, 2000.

* cited by examiner

SOFT HANDOFF IN IP-BASED CDMA NETWORKS BY IP ENCAPSULATION

1. BACKGROUND OF THE INVENTION

1.1 Technical Field

The invention relates to mobile communication devices. More particularly, the invention relates to base station soft handoff in IP-based CDMA Networks.

1.2 Related Art

Handoff is a process in which a mobile station communicating with one base station (referred to as the serving base station or SBS) is switched to another base station (referred to as the target base station TBS) during a call. Soft handoff is a form of handoff in which a mobile station starts communicating with the target base stations without interrupting the communication with the serving base station. Soft handoff has been shown to be an effective way for increasing the capability, reliability, and coverage range of CDMA networks. Soft handoff also helps reduce outage area size, achieves macro diversity gain, and provides more time for carrying out the handoff procedure.

Soft handoff may be implemented in an IP-based wireless network as illustrated in FIG. 1. The coverage area of the wireless network consists of cells 102, 103, and 104. Each cell is a geographical area that has a single wireless base station $BS_1$, $BS_2$, and $BS_3$, respectively. The wireless network includes an IP network backbone 101 as is know in the art. An example of an IP-based wireless network is CDMA.

Soft handoff may be defined as a mobile station or mobile terminal receiving the same data from two or more base stations at the same time. Also, the mobile station or mobile terminal next combines the copies of the data from the different base stations into a single data stream and regenerates packets for applications associated with the mobile terminal. Soft handoff regions of FIG. 1 are represented by overlapping regions of cells 102, 103, and 104.

FIG. 2 illustrates how conventional centralized wireless networks implement soft handoff. FIG. 2 shows a serving base station 204 and a target base station 205 both communicating with a mobile terminal MS 206. A serving base station 204 is a base station that is acting as a primary base station for the mobile terminal 206. The target base station 205 is a base station that has recently become known to mobile terminal 206 or whose signal power (or other signal characteristic, e.g., signal to noise ratio) is above a threshold. A selection and distribution unit 201 generates packets 202 and 203 and sends them to serving base station 204 and target base station 205, respectively.

Three activities occur in soft handoff including transmission frame synchronization, data content synchronization, and data content combination.

With transmission frame synchronization, the mobile station collaborates with the base stations to synchronize the radio channel frames received (and transmitted) by the mobile station.

With data content synchronization, the centralized Selection and Distribution Unit (SDU) is responsible for distributing traffic, over layer-2 circuits, via different base stations to the mobile station and ensuring that the matching link-layer (and physical-layer) frames sent to different base stations contain copies of the same data. This applies to the forward direction (from the SDU 201 to the mobile terminal 206). In the reserve direction, the mobile terminal 206 ensures that the matching link-layer frames sent to different base stations contain copies of the same data.

With data content combination, in the forward direction, the mobile station combines the radio signals received in the matching frames from different base stations to generate a single final copy of each piece of received data. In the reverse direction, the SDU 201 selects one of the data received from different base stations.

To support the growing number of users of IP networks, base stations are believed to need to become autonomous. However, the current approaches for supporting soft handoff in an IP wireless network do not readily support autonomous IP-based base stations. These limitations include: the inability of mobile terminals to identify copies of the same data due to IP address changes, loss of data content synchronization, the inability to combine duplicate IP packets due to multiple link-layer connections to the mobile station, and the conflict with network layer or above layer mobility support.

First, mobile stations served by different base stations may have to use disjoint sets of IP addresses. This, for example, is likely the case when the mobile stations are served by different base stations that belong to different IP subnets. In such cases, the approach designated in FIG. 2 over, for example, WCDMA networks will cause packets sent from different base stations to the same mobile station to carry different destination IP addresses. Consequently, the mobile station 206's radio system, which operates at protocol layers below the IP layer, will not be able to determine whether two pieces of data, each arriving from a different base station, are copies of the same data. This frustrates the soft handoff requirements of data content synchronization, and data content combination as defined above. Accordingly, mobile stations may experience difficulty in identifying copies of the same data due to IP address changes.

Second, in conventional centralized CDMA networks, data content synchronization is achieved using a centralized control entity—the Selection and Distribution Unit 201. In particular, the SDU 201 ensues that data contents carried in matching frames 202 and 203 sent to different base stations are copies of the same data. In autonomous IP-based wireless base stations, centralized control entities will no longer exist. Consequently, even though the CDMA radio system is capable of synchronizing the link and physical layer frames on the radio channel, it cannot guarantee that the matching frames from different base stations will carry copies of the same data. This is because the copies of the same IP packet may arrive at different base stations at different times and may be transmitted by the base stations to the mobile station at different times. As a result, the mobile station's radio system may not be able to determine which frames received from different base stations contain copies of the same data. This problem is illustrated in FIG. 3.

FIG. 3 shows frames 301-305 from a serving base station and frames 306-310 from a target base station. The mobile terminal 206 receives frame B 301 from the serving base station as frame 1. Due to propagation delay or network delay or other random delays, frame B 309 is not received from the target base station until frame 4, suffering from a random delay 311. Accordingly, when the mobile terminal attempts to combine the first frame received, the mobile terminal will attempt to combine content B from the serving base station with the content X from the target base station. This disruption in the content from the serving base station arriving at the same time as the content from the target base station may be referred to as the loss of data content synchronization.

Different types of synchronizations between the source base station and the target base stations may be used. The types of synchronization include time-stamping the transmissions, transmitting the signals during a predefined window and attempting to synchronize the received transmissions based on pattern matching the received packets.

Third, transporting IP packets over CDMA networks (or over any other network) requires a link layer protocol that is capable of packet encapsulation/framing, i.e., the ability to reassemble IP packets at the receiving host. Today, for example, most proposals for IP-based CDMA networks use the Point-to-Point Protocol (PPP) defined by the Internet Engineering Task Force (IETF) for this purpose (see D. Perkins, "The Point-to-Point Protocol: A Proposal for Multi-Protocol Transmission of Datagrams Over Point-to-Point Links" IETF RFC 1134, November 1989.). However, link layer protocols like PPP could, without further innovations, make soft handoff impossible in many cases. For example, a single PPP connection, even when the PPP Multilink Protocol is used, cannot support multiple simultaneous copies of the same traffic stream between a base station and a mobile. Multi-link PPP can be modified to transport multiple copies of the same data simultaneously via different base stations to the mobile station. However, this cannot solve the data content synchronization problem. If a separate PPP connection is used by the mobile station to connect to each different base station, the conventional standard link-layer protocols will not be able to combine the packets arriving at the mobile station from different PPP connections. Consequently, duplicate IP packets have to be delivered to the IP layer. Unfortunately, the conventional standard IP layer protocols cannot combine duplicate IP packets either. As a result, the soft handoff requirement of data content combination as described above is violated.

The transmission control protocol (TCP) (e.g., J. B. Postel, Editor, "Transmission Control Protocol" IETF RFC793, September 1981), which is immediately above the IP layer, can detect and discard duplicate IP packets. However, TCP does not combine IP packets. The user datagram protocol (UDP) (e.g., the UDP (User Datagram Protocol)(see J. B. Postel, "User Datagram Protocol", IETF RFC768, August 1980), which is also immediately above the IP layer, does not even detect duplicate IP packets; it simply passes on each incoming IP packet to the upper layer applications. Consequently, soft handoff cannot be achieved due to the inability to combine duplicate IP packets. This may be understood as an inability to combine duplicate IP packets due to multiple link-layer connections to the mobile.

Fourth, sometimes soft handoff involves IP address change of the mobile station. For instance, if the target base station belongs to the different IP sub-network from the serving base station and starts to take the "serving" role because the mobile station is approaching enough near to the target base station, the IP packets to the Mobile Station have to be directly routed to the target base station that now becomes new serving base station. The IP address of mobile station has to be changed to the new one belonging to the same sub-network address range as that of the target base station. This relates to problems in data content combination if PPP is used, since this makes the migration of the PPP end point on the base station side. Usually this IP address change is managed by the mobility management function in the network layer and works independently from a layer 2 system. In this regard, an unexpected change of the serving base station in link layer breaks IP communication over the link. Here, the network layer mobility management recovers the connection and an expected packet passing route change by the network mobility management breaks the soft handoff processed in the layer 2. This happens when the base station works autonomously and there is no layer 2 anchor point like SDU any more. Instead of such disruption, seamless and smooth handoff for the IP communication is required even in this case.

2. SUMMARY OF THE INVENTION

The present invention relates to soft handoff between IP (Internet Protocol)-based autonomous wireless base stations that use CDMA radio technologies (including cdma2000, cdmaOne, and W-CDMA). Also, the present invention may be applied to any wireless network that is capable of supporting soft handoff or macro or site diversity.

The present invention includes the serving base station generating a copy of information to be sent to a mobile terminal and sending the copy to the target base station for forwarding to the mobile terminal. The serving base station addresses issues including synchronizing the transmission interval from the target base station to the mobile terminal.

The present invention supports macro diversity or site diversity. Macro diversity allows a mobile station to receive data from multiple base stations at the same time. Macro diversity increases wireless transmission quality and system reliability, especially for the case of the so-called "shadowing" in an urban environment.

A number of advantages of forwarding IP packets include a reduction in the number of packets passed between base stations even though the packet length remains large and independent from the radio technology and offering easy harmonization with IP layer handoff.

These and other aspects of the invention will be apparent from the following drawings and description.

3. BRIEF DESCRIPTION OF DRAWINGS

4. DETAILED DESCRIPTION

The present invention relates to soft handoff between autonomous base stations in an IP network.

The base stations in an IP network are different from non-IP network base stations in that they can perform IP-layer processing (e.g., routing and forwarding of IP packets based on the information carried in IP headers, signaling, and mobility management). The IP enabled base stations will be referred to as IP-based base stations and denoted by $_i$BSs.

IP-based base stations may function autonomously as described in co-pending U.S. Ser. No. 09/835,855, filed on, entitled "Autonomous Base Station Setup and Soft Handoff", whose contents are incorporated herein by reference. Autonomous base stations do not need constant centralized signaling control over their behaviors or determinations of how the IP network 101 is to function from a central control. Further, $_i$BSs are interconnected via an IP network. For simplicity, the $_i$BSs are referred to herein as BSs.

Figure 1:
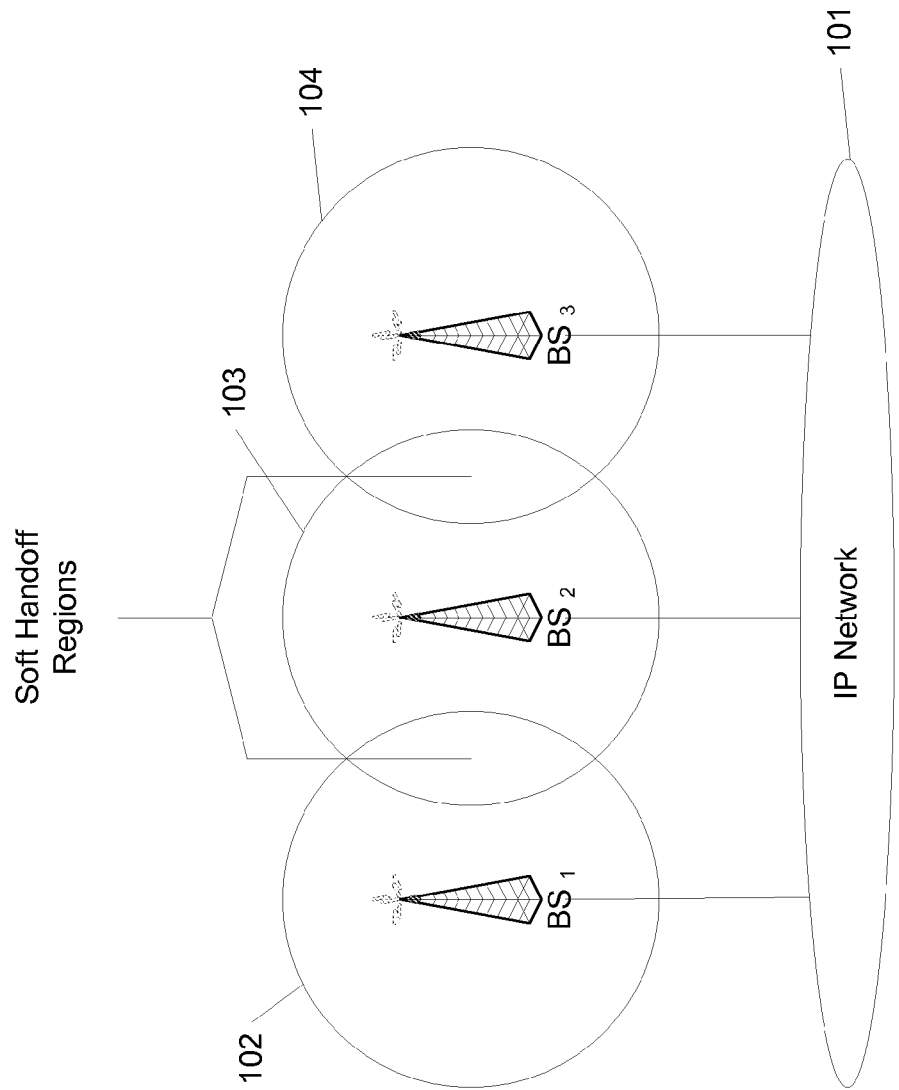
FIG. 1 shows base stations in a conventional IP network.
Figure 2:
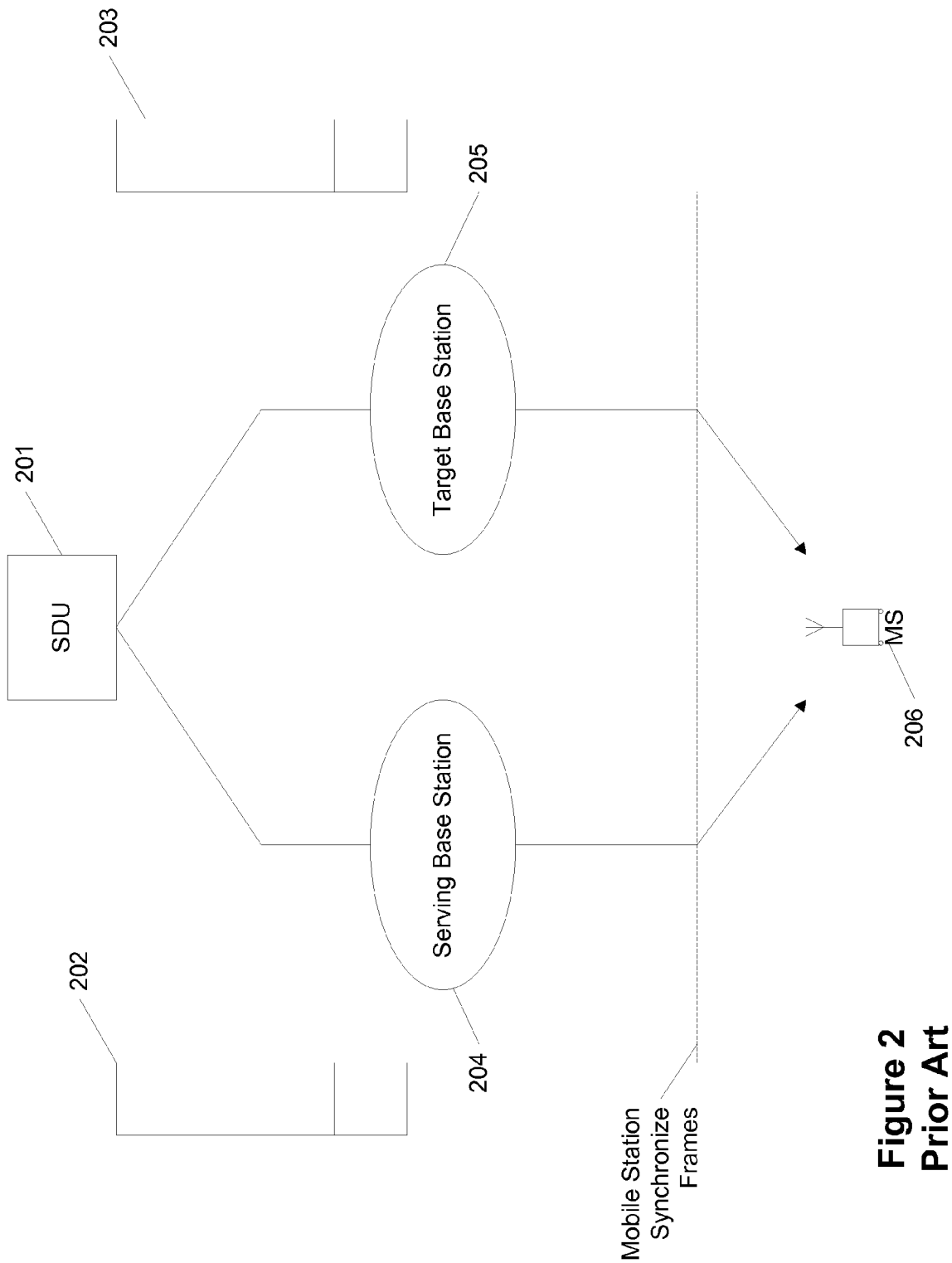
FIG. 2 shows a conventional soft handoff forward link.
Figure 3:
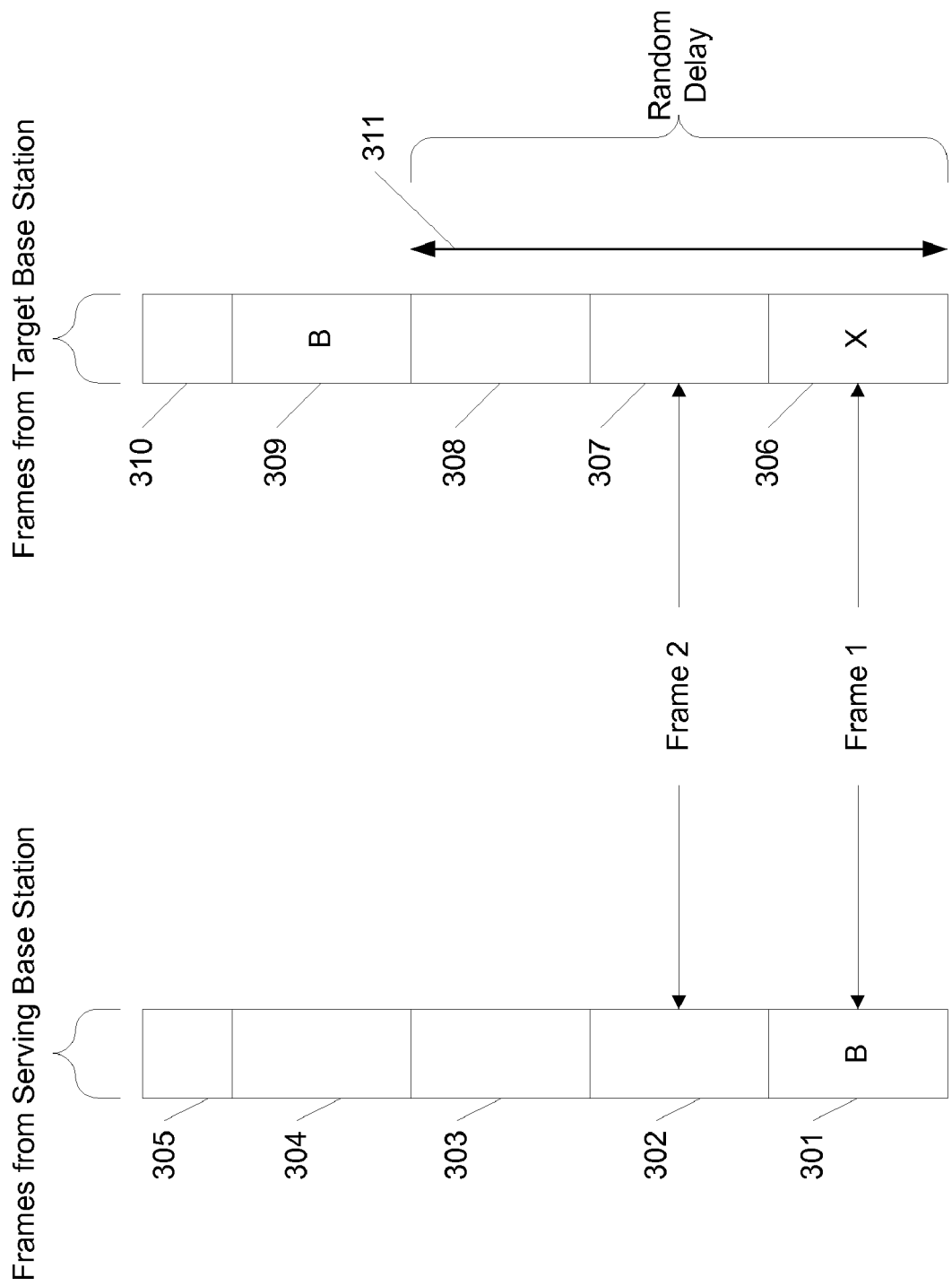
FIG. 3 shows frame desynchronization based on the system of FIG. 2.
Figure 4:
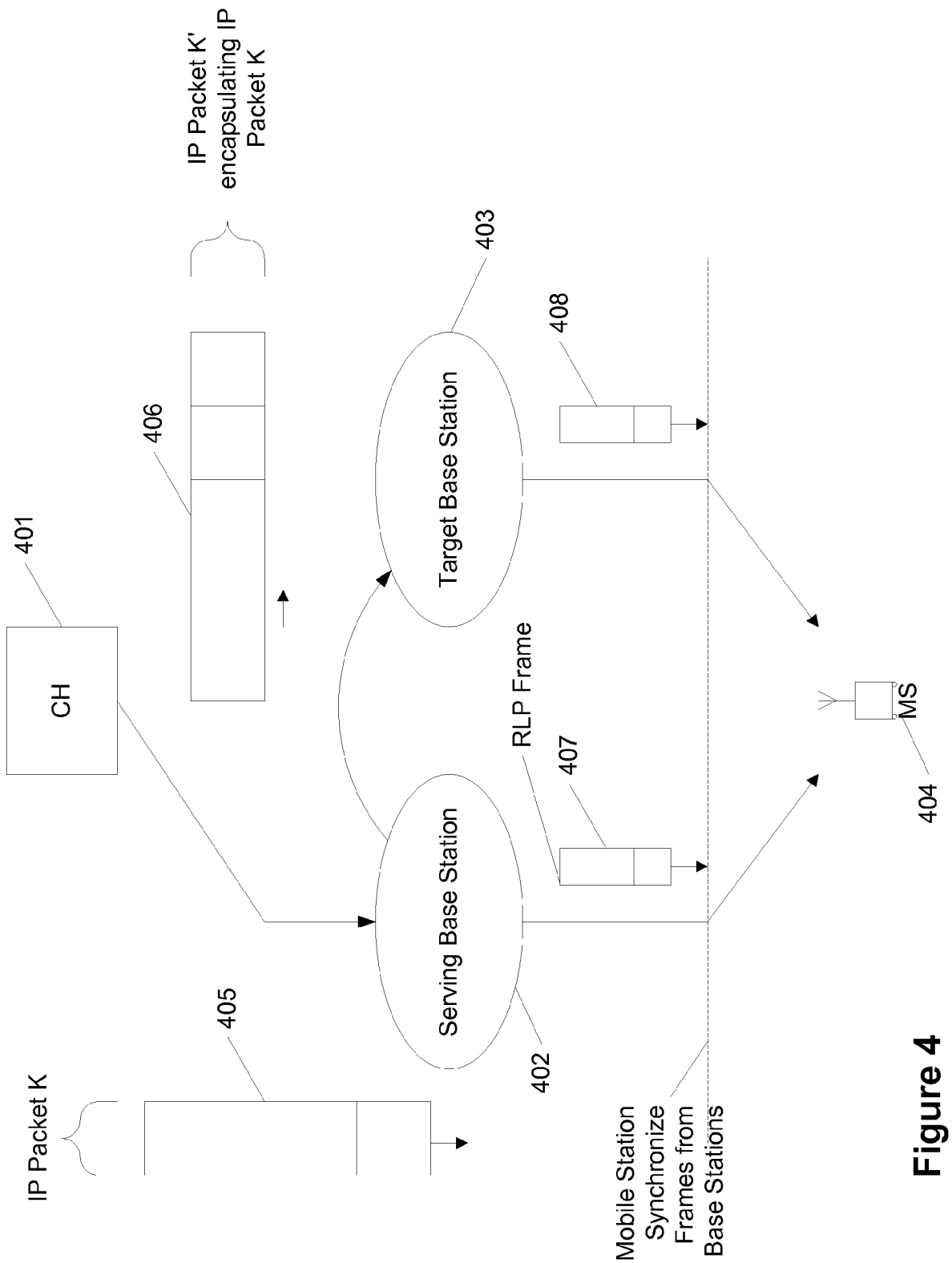
FIG. 4 shows a system for performing soft handoff in accordance with embodiments of the present invention.

FIG. 4 shows soft handoff between a serving base station and a target base station. In FIG. 4, a correspondent host CH 401 transmits IP packet K 405 to serving base station. The serving BS 402 needs to forward it to the target BS 403 which is serving another leg to forward the same data to the MS. There may be more than one target BS, although the explanation here describes the case of only one target BS. Thus, it is readily appreciated that three or more target base stations may be used to transmit data to a mobile station 404.

Previous to the exchange shown in FIG. 4, serving base station 402 has set up a tunnel or conduit between the serving base station 402 and the target base station 403 over which to transmit information destined for mobile station 404. This tunnel may be set when the serving BS 402 finds the target BS 403 as a neighbor (static tunnel) or when the first packet forwarding to the target BS 403 is needed (dynamic tunnel). The IP packet 405 carried to the serving BS 402 is encapsulated by another IP header (the header of packet 406) for passing through the IP tunnel. Next, packet 406 is forwarded to the target base station 403. The forwarded IP packet 406 is de-encapsulated (decapsulated) and recovered as an original packet. The recovered packet is the same as packet 405 as received by the serving base station.

Next, both the serving base station 402 and the target base station 403 make radio link protocol (RLP) protocol data units (PDUs) from the received IP packet (405 for the serving base station 402 and the decapsulated version of packet 406 for target base station 402). Then the RLP PDUs 407 and 408 are sent over the air at the same time to the mobile station MS 404. The mobile station MS 404's radio system combines these signals and receives the combined packets 407 and 408 as one signal. Since the mobile station MS 404 it combines those signals in the radio layer, high sensitivity and low error rate are realized by this soft handoff.

Figure 5:
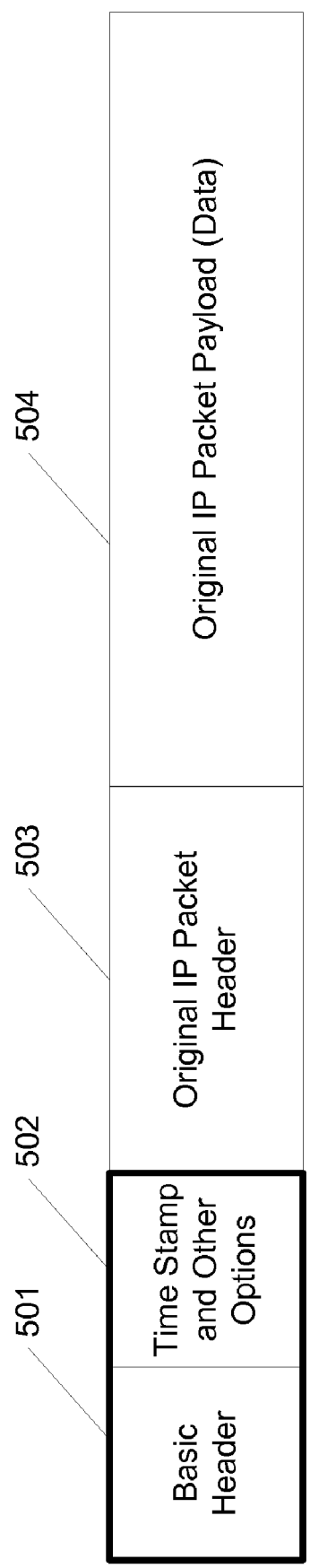
FIG. 5 shows an encapsulated packet of data in accordance with embodiments of the present invention.

The serving BS 402 assigns a potential time for the target BS 403 to send out RLP PDUs and put the time into the option field of the IP header for encapsulation. In the case of cdma2000 system, each BS has a precise clock which is adjusted by the GPS system. Therefore, the serving BS 402 may assign the absolute time to transmit. FIG. 5 shows an example of the header format in this case. Here, the original IP packet payload (or data) is shown by field 504. The original IP packet header is shown by field 503. The header added by serving base station 402 is shown as basic header 501. As mentioned above, the serving base station 402 may add additional information including a time stamp option or other options indicating, among other things, when the RLP PDUs are to be transmitted to the mobile station 404.

If there is not such synchronized clock between BSs, the relative time information could be used. If a usual IP network is assumed as a network for BSs to communicate each other, it may be difficult to predict the packet traffic behavior. Therefore, a feedback mechanism may be installed for a serving BS 402 to maintain the ability to calculate the accurate timing for transmissions to target base stations by monitoring when a packet was sent to a target base station and awaiting a response. When a response is received by the serving base station, the serving base station may divide the elapsed time in half and determine an average propagation delay (this may or may not include subtracting processing time associated with generating a response by the target base station as this processing time may be equal to a time associated with generating and transmitting a RLP PDU to the mobile station 404). Alternatively, the target base station may indicate when the packet was received, thereby providing an accurate determination of the delay associated with sending a packet to the target base station. This delay may be associated with the time of day and day of the week to establish the minimum propagation time to the target base station. Finally, the serving base station may vary the time between it transmits a packet 406 to the target base station and when it transmits RLP frames 407 to the mobile terminal. Next, the serving base station may then ask the mobile terminal what frames were received in synchronization. If one estimates the delay from the serving base station to the mobile station and the delay from the target base station to the mobile station to be equal, the serving base station may then know how much delay was needed to make the RLP frames from the serving base station and the target base station to arrive at the mobile station at the same time.

Another way of determining delay is to have the mobile station monitor the delay of data it receives from different base stations and report the results to the serving base station. A further way of determining delay is by the network management system monitoring and reporting delay to each BS. For instance, the network management system monitors the load of each network entity (e.g. a router) and the elapsed time for the packet to pass through the entity. Then, the network management server can suggest the packet transportation delay from the serving base station to the target base station on the result of the network monitoring.

Where possible, the forwarded IP packet 406 may carry additional information to make each BS generate the same RLP PDUs and send them at the same time. In the situations in which this is needed, the serving BS 402 may insert timing information into the encapsulated packet. The system may append information to the packet or replace null information in the packet with timing information. Alternatively, one may align timing by returning the timing error information from the target BS 403 to the serving BS 402. It is the similar mechanism that is designed for the radio frame forwarding between BSs in the cdma2000 standard. Currently there are several potential IETF protocols to be used for IP-IP encapsulation, including IP in IP (see C. Perkins, "IP Encapsulation within IP", IETF RFC 2003, October 1996), Minimal Encapsulation (see C. Perkins, "Minimal Encapsulation within IP", IETF RFC2004, October 1996), GRE (see D. Farinacci, et. al., "Generic Routing Encapsulation (GRE)", IETF RFC 2784, March 2000), and MPLS (see G. Armitage, et. al., "MPLS: The Magic Behind the Myths", IEEE Communications Magazine Vol. 38 No. 1, pp. 124-131, January 2000) and the like. One may define new fields in the various protocols or use a different protocol for the control information. The case of MPLS is a little bit different from other scheme, since that uses specific packet format to pass IP packet in MPLS tunneling. But MPLS tunneling is usually set in/under the IP network based on IP address and, in this sense, it is included in the IP-in-IP encapsulation scheme here.

Further, the system may use guaranteed quality of service (QoS) control capability of the network to determine when the RLP frames should be sent to the target base station. Even in the IP network, the traffic behavior is guaranteed in some sense, if QoS is set for the traffic. Absolute delay is usually one of the guaranteed aspects. By setting certain delay values for the communications from serving BS 402 to target BS 403 and forwarding the encapsulated packet at the certain time from the serving BS 402, the packet transmit timing synchronize automatically. If the delay set up is fairy large compared with the radio frame length (e.g. 20 ms) and the deviation of the time for the packet to reach to the target station is large, the encapsulated packet may have the time stamp and target BS may have the buffer to make wait the data. Because target BS may transmit the data earlier than the time when serving BS expected.

As another solution, MS may have the good synchronization scheme. Thanks to the semiconductor technology, the power of the signal processing is being improved year by year. As a result, MS will have enough processing power and memory capacity to synchronize physical signals carried over different legs with fairy large time error or even in the different slot. In this case, the additional header for encapsulation does not need to include any optional timing information and the packet format and the negotiation between BSs becomes simple. For example, the mobile station 404 may match frames by using pattern matching schemes to match frames to each other. Additional material regarding pattern matching is disclosed in U.S. Ser. No. 09/835,855, filed on, entitled "Autonomous Base Station Setup and Soft Handoff", whose contents are incorporated herein by reference.

Some Packet Encapsulation schemes change the packet length. In the IP network, many packets, especially which carry the user data, already have the maximum length allowed on the path. And for those packets, change of their length may cause additional problem. Header compression is one solution to that.

Additional considerations are needed in the reverse direction. In the reverse direction, the selection of the RLP PDU is needed during the soft handoff. For that RLP PDU received by target BSs have to be sent to the serving BS by encapsulation into the IP packet. Next, serving BS selects the proper RLP PDUs, regenerates the IP packet from a set of them, and sends it out to the CH. To receive a benefit of the soft handoff, this selection has to be done in the scale of RLP PDU. In this case, more than one RLP PDUs may be carried by one IP packet to reducing the IP encapsulation/decapsulation process load and efficient use of the network. It is another potential way to restrict the maximum size of the IP packet from the user fit to one RLP PDU size, since to select RLP PDU becomes similar to select IP packet.

The present invention also includes network layer mobility management to address the mobility layer conflict. IP address change on mobile station keeping communication with others is considered as a handoff process at the network layer. When the link layer (so called layer 2) handoff occurs, the network layer handoff has to be done around that time. In the case of soft handoff described above, the network layer handoff needs to synchronize an exchange of the role of "serving" between IP-centric autonomous BSs and those belong to a different IP subnet. The present invention's network layer handoff using soft handoff in the network layer addresses this situation and helps maintain proper independence between layer 2 (L2) and above layers (e.g. the network layer). Optionally, it also gives a mean to keep the efficiency of the radio resource (i.e. frequency) usage. While cellular IP uses a similar scheme named "Semisoft Handoff" to solve a problem with network layer handoff (see A. Campbell, et. al. "Design, Implementation, and Evaluation of Cellular IP", IEEE Personal Communications Vol. 7 No. 4, pp 42-49, August 2000), the approach fails to sufficiently address the problem as it does not support smooth handoff when the mobile station undergoes an IP address change and does not take the L2 soft handoff into consideration. The mobile station MS 404 in FIG. 4 may use a single IP address to communicate with both base stations 402 and 403 during the layer-2 soft handoff process. The mobile station MS may need to use a different IP address when it finishes the layer-2 soft handoff process and moves completely inside the new cell if the mobile stations in the serving and target base stations are on different IP subnets. The process of changing IP address (which is part of the Network Layer Soft Handoff described herein) may be performed in parallel and separate from the layer-2 soft handoff.

In the present invention's network layer handoff scheme, the mobile station 404 has an IP process function that is capable of multi-address handling. The mobile station 404 can support two IP addresses (or more depending on the number of related base stations) during the L2 soft handoff process. Once assigned the two or more addresses, the mobile station 404 registers the addresses to the correspondent host 401 CH or somewhere else that is working as an anchor point for the network layer mobility management. Other anchor points that may be used include the Home Agent (HA) in terms of the Mobile IP (see C. Perkins, Editor, "IP Mobility Support", IETF RFC 2002, October 1996). When using the correspondent host 401 as the anchor point, the correspondent host 401 sends its IP packets to both addresses. The mobile station 404 receives the packets destined for each address. The upper layer program, like TCP, usually just discards the same information coming later. This may be referred to as "network layer soft handoff" as the system uses two or more IP routes at the same time to implement soft handoff. By using the network layer soft handoff, the mobile station 404 does not need to worry about which BS is the serving base station or the target base station during L2 soft handoff. If the serving BS 402 stops its role as the serving base station after transferring its serving role to the target BS 403, the mobile station 404 drops the IP packets routed through the original serving base station 402 (now the target base station 402). The mobile station 404 continues to receive IP packets directed to the former target BS from the CH. By using this approach, the mobile station does not see a disruption with communication with the correspondent host 401.

The above description uses two different sub networks. This network layer soft handoff method is also useful for handoff between base stations belonging to the same sub network if the network has an ability to handle the packet to the mobile station as multicast packet passed through over more than one routes. In this example, the mobile station registers its new IP leg to the multicast service in the network during L2 soft handoff. That leg may be distinguished from the existing leg by another IP address assignment. In another way, the special routing function in L3 or L2 may set the routing in the sub network to carry the same IP packet from the CH over more than one route. Again, the mobile station does not see any disturbance if the communication to the correspondent host if one of the base stations involve in L2 soft handoff stops forwarding packets to the mobile station.

To realize the network layer soft handoff, a multi-IP address capability is used to realize the IP process function of the Mobile Station as is known in CDMA systems and the like. In CDMA systems, the same physical device has the more than one IP address. It is slightly different from the current multi-home concept in which the IP stack usually handles more than one physical interface having one IP address. The multi-home concept may apply to any wireless or wired layer-2 technology including CDMA systems.

At the same time, the correspondent host CH, home agent HA, or other an anchor point has an IP process function that forwards the same data to one or more IP addresses. The anchor point here means the entity where the IP packet exchanged between CH and MS has to be passed through. The Home Agent in the context of the Mobile IP protocol may be an example. A gateway router for the sub network including the serving BS and/or target BS, or the serving BS itself here may be another example. The IP packet has to be copied and distributed at such anchor point for the network layer handoff presented here. This function is similar to the MCU (Multipoint Control Unit) supporting the centralized multipoint IP conference in the H.323 LAN system. (See U. Black "Advanced Internet Technologies", Section 5, Prentice-Hall 1999.)

Figure 6:
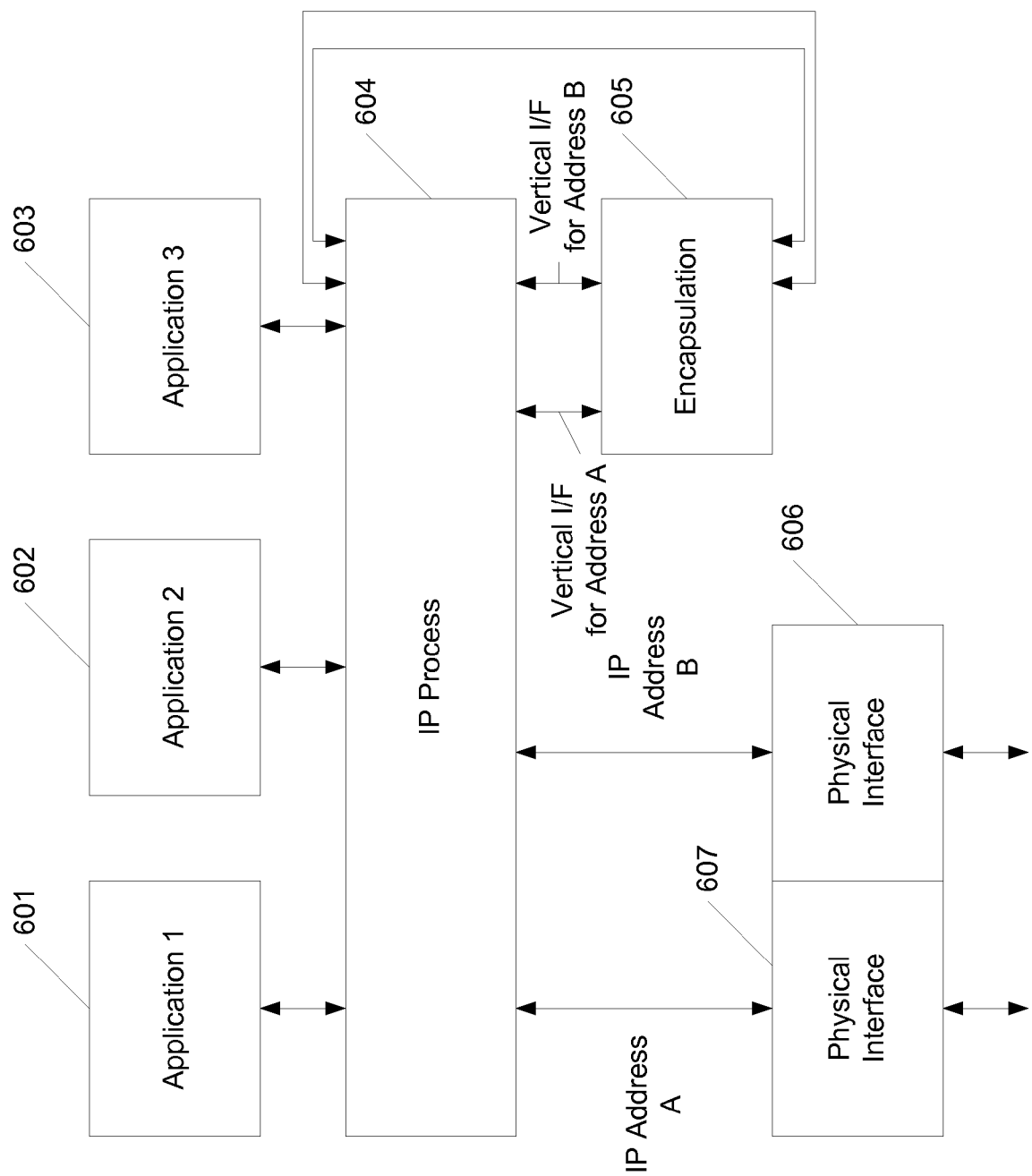
FIG. 6 shows an arrangement of an IP stack architecture for a coordinating host in accordance with embodiments of the present invention.

FIG. 6 shows protocol stack architecture to support proposed solution including such IP process function for the correspondent host or other anchor point. An application 1 601 uses the IP Process 604 to communicate with other applications (2 602 and 3 603). The applications may correspond to applications in the mobile station or may be network level applications. IP address A is assumed as the original mobile station IP address. The application 1 601 continues to communicate with the address A, while the mobile station is moving to the area managed by another BS. At this time, the mobile station gets a new IP address B and reports it to the correspondent host CH. The IP process in CH registers address B in its table and starts to use both IP addresses A and B for the network layer soft handoff. The data generated by the application and for the address A is transformed to the IP packet by adding IP header destined to address A and copied in the IP process. One of them is sent out through physical interface 607 and the other is put into vertical I/F for address A to be encapsulated by another header destined to address B by encapsulation module 605. Then it is sent out to the network through physical interface 606. The IP process has a table to memory these relations among IP addresses, Applications, Encapsulations and so on and maintains it by the application's activity and the reports from the IP process at the other end of communication. The current IP process has a table referred to as a "routing table" which only shows relation between destined IP address and physical interface. For the reverse path, the IP packet coming from MS to CH is not necessarily to be encapsulated. The IP process in the CH just removes the IP header and passes the payload up to the proper socket. Since each packet may have different source IP addresses during the network layer soft-handoff, the IP process uses the same table recording the last MS's IP address.

Figure 7:
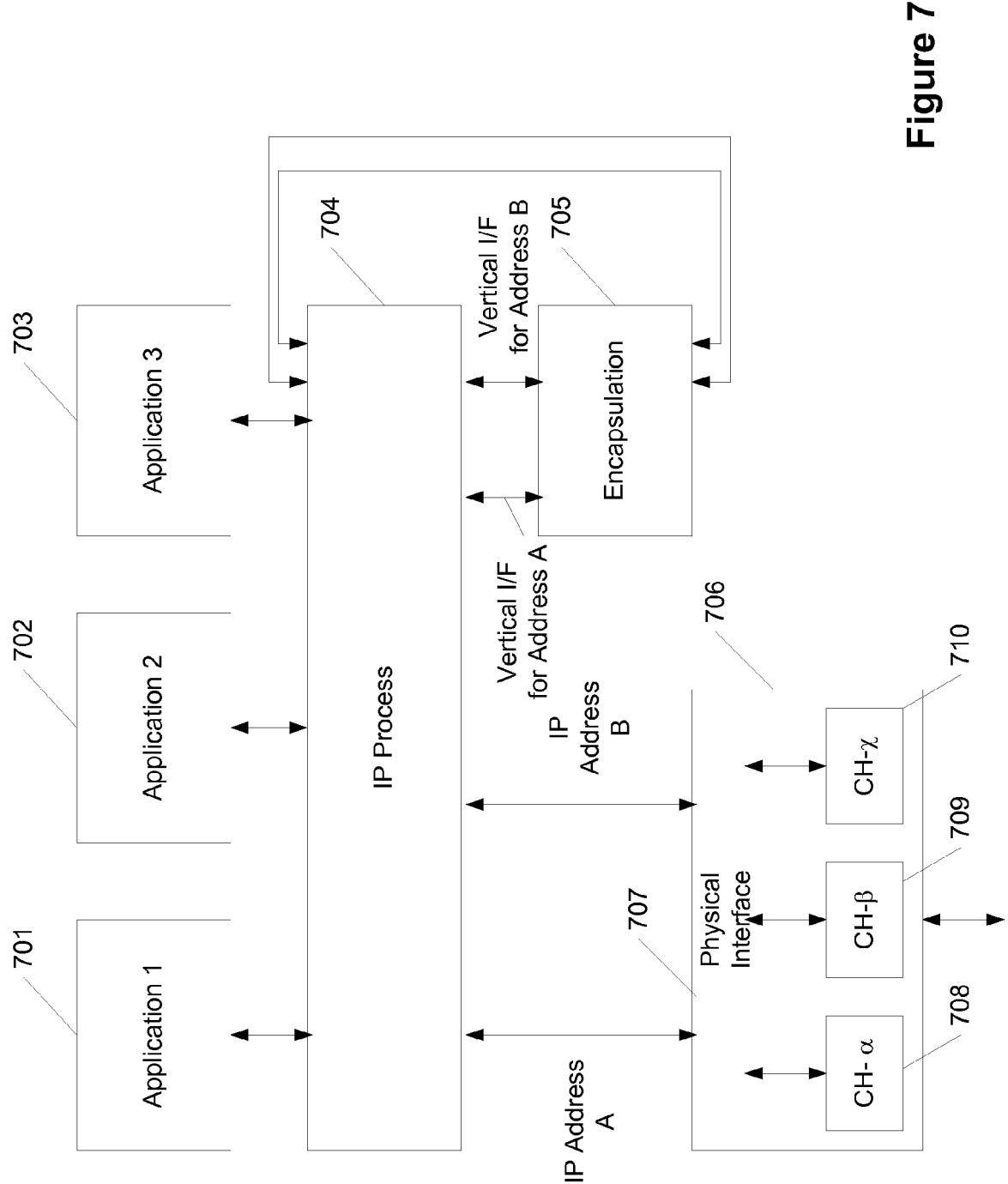
FIG. 7 shows an arrangement of an IP stack architecture for a mobile station in accordance with embodiments of the present invention.

FIG. 7 shows another example IP stack architecture for the mobile station MS. The mobile station in FIG. 7 has two IP addresses A and B. The IP stack architecture is similar to that of FIG. 6 but is applied to the mobile station MS. It is noted that, if the mobile station can use any address as the source address, encapsulation may not be performed. However, some networks do not permit the mobile station to use any address so the mobile station needs to put the latest address as the source address. The IP process 704 uses encapsulation this case to protect applications from the confusion by the address change. Also, the connection between IP process 704 and physical interface 706 may use encapsulation. The radio system, like the next generation CDMA system for example, may require just one radio channel (with several supplemental channels to it) for the whole IP communication or may require separate channels depending on the IP addresses, QoS, and the like. The IP process needs to fit these requirements by being flexible to send and receive IP packets with various kinds of address and encapsulation. This management is done by using the table which shows the proper relation among the status of applications, related IP addresses, related physical interfaces, encapsulation situations, network layer soft handoff situations and the like.

Figure 8:
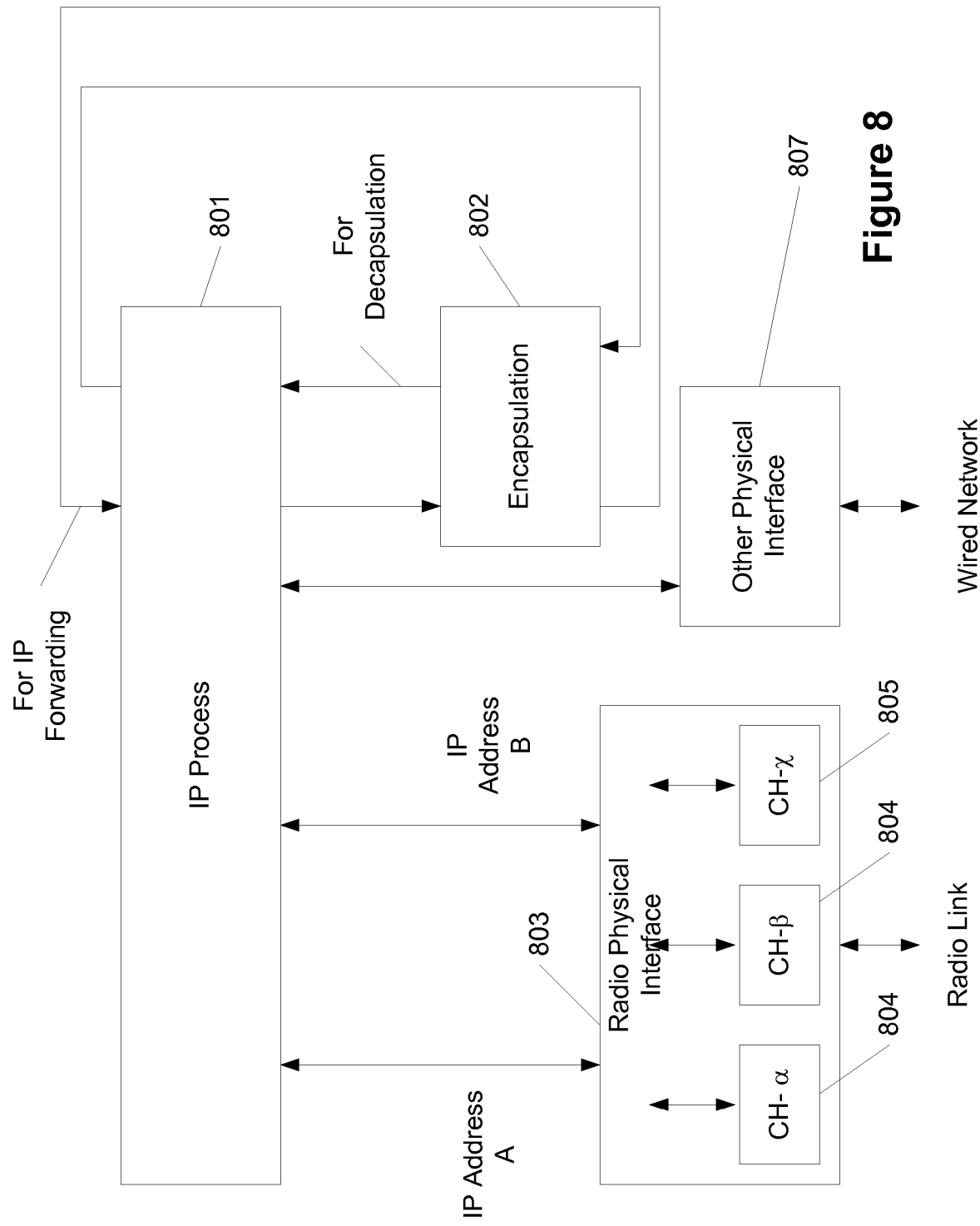
FIG. 8 shows an arrangement of an IP stack architecture for a base station in accordance with embodiments of the present invention.

In the autonomous BS, a slightly different IP stack architecture is used as shown in FIG. 8. The mobile station has two IP addresses in this example. The base station is described as being a serving base station for communication with address A and a target base station for communication with address B. An incoming packet destined to address A is processed as follows. First, it is copied into two packets. One of them is put into the encapsulation function 802 to be forwarded to the target base station and is sent out to the target base station through the interface for the wired network 807. The other packet is passed to the radio physical interface to be transferred over the radio link with the mobile station using at least one of sub channels CH-$\alpha$ 804, CH-$\beta$ 805, or CH-$\gamma$ 806. As described before, the packet in the radio physical interface 803 is processed in the each base station's radio interface and transmitted to the mobile station at the same time or at another agreed upon convention (using a timing window or permitting the base mobile station to use pattern matching to match the frames). At the target base station, the packet forwarded from a serving base station is decapsulated to retrieve the original packet destined for address B and is passed to the radio physical interface 803. Since the same radio channel (or that may be assigned with several supplemental channels) may be used for both addresses during the soft handoff, IP process has a capability to connect to more than one destination addresses with one interface. The IP process 801 may use a table to manage the relationships. The radio physical interface 803 manages timing to transmit each radio frame as directed by the source BS of each packet. In the reverse direction, the IP process has to switch incoming packets to encapsulation or wired network regarding the source and destination address of the packet. That is also managed using the table. As described here, a flexible IP process is used with a routing table to assure proper management for realizing network layer soft handoff.

One drawback of the network layer soft handoff is a reduction in efficiency of frequency usage over the radio link as more than one packet exists for each set of data being transmitted between the mobile station and the correspondent host or other anchor point. This may not be an issue if the period of the network layer soft handoff is short. To reduce the degradation in efficiency, the base station attempts to stop forwarding duplicate packets when possible. That means the network layer soft handoff becomes a conventional network layer hard handoff from the mobile station's point of view and seamless IP communication during the handoff becomes a problem again.

To overcome this problem, another way is disclosed in which the network layer soft handoff is used for the reverse direction to help the network layer hard handoff (i.e. current handoff scheme) in the forward direction. In this method, the correspondent host continues to send packets to one destination IP address at one time. The mobile station MS sends acknowledgement packet (e.g. ACK, NACK etc. . . . ) to the correspondent host. The acknowledgement packet is sent to the CH from all IP addresses assigned to the mobile station. The acknowledgement packet may be carried over the L2 channel, which doesn't use soft handoff. Next, the acknowledgement packet is investigated by the correspondent host or other anchor point (when a tunneling scheme is used). Since the acknowledge packet does not use soft handoff scheme and the packet route passed through from each base station to correspondent host is similar to each other, the primary delay or interference is generated by the air link interface. For instance, the loss rate and/or delay increases if radio link condition degrade. Then the correspondent host (or anchor point) determines the working destination IP address from the investigation result. This method does not consume as much air link resources on the forward direction but increases the air link resource usage on the reverse direction somewhat. The degradation is as significant as the acknowledgement packet is usually small compared with another data packet. Such degradation is suppressed if the source IP address of the acknowledge packet is changed in turn among the IP addresses assigned to the mobile station (e.g. by using a round robin scheme or the like). To realize this scheme, one may use a multi-IP address capable IP stack as discussed above.

Another way to keep frequency usage high includes using an IP packet filter on the base stations. Each serving or target BS knows whether it is in serving role or not. It is also possible to know which IP packet forwarded from serving BS is the same packet as that delivered from CH directly. Therefore, on the target BS, the packet filter is set to discard such duplicated packet coming from the correspondent host directly and the target BS sends the forwarded IP packet from the serving BS only. When the serving role is exchanged between BSs, this setup of the filter is also changed to forward IP packets only through the new serving BS to MS in both base stations. If this information about the serving and target BSs is delivered to CH or another anchor point, which controls the network layer mobility by defining such location, it is easier for them to switch flow from the old serving BS to the new serving BS. The switch requires interaction between L2 and the network layer with such interaction tending to reduce the independence of each layer design.

In a further aspect of the present invention, handoff is controlled by the mobile station. In the invention described above, the soft handoff method mainly aided in keeping IP communications alive during the serving role transfer between base stations involved in the L2 soft handoff. In an alternative embodiment, the transfer occurs at the end of the L2 soft handoff period. This method is described in relation to FIG. 4. In this scenario, IP-in-IP forwarding from the source BS 402 to the target BS 403 is used during the L2 soft handoff as described before. When the mobile station 404 moves enough near to the target BS 403 to stop the L2 soft handoff, the radio link between the mobile station 404 and the source BS 404 is closed. This means that the L2 serving BS role has been moved into the target BS 403 at this point. But IP-in-IP forwarding still goes on at the old serving BS to keep the user's IP communication in effect. If the mobile station 404 moves around an area supported by the old serving BS 402 or its adjacent BSs only, it is good for the old serving BS 402 to keep this IP-in-IP forwarding to the latest serving BS 403. This is because that reduces the number of times of the network layer handoff needs to exchanging signaling information and eliminates most of the processing time.

Further, as an alternative to transferring the serving function, even the serving role may be kept by the original serving BS 402 regardless the position of the mobile station 404 in this scenario, if the old serving BS 402 is often involved in the L2 soft handoff for the mobile station 404. The advantage here is the reduction in the load of the role transfer process. The serving BS 402 may switch between the usage of the time stamp technique and/or soft handoff related options on and off in its IP-in-IP forwarding process whether L2 soft handoff is used or not. Moreover, the serving BS may just leave those option fields as empty when the L2 soft handoff is off. Even in this example, the mobile station 404 may have additional IP addresses and use the IP process function explained above, although the IP address for the packet passing through the serving BS is not needed to be changed.

When the mobile station 404 has gone far out from the area covered by the serving BS 402 and its adjacent BSs, the serving role transfer happens as well. It is effective for the mobile station 404 to help this and the network layer handoff since the mobile station 404 may be able to know both of the L2 environment and the network layer environment. At that time the mobile station 404 has at least two IP addresses and may invoke the network layer soft handoff described above to keep continuous communication during the L2 serving role transfer. Alternatively, the mobile station 404 may send the request for binding to the new IP address to its correspondence host 410 or another anchor point placed between the mobile station 404 and the correspondence host 410. This changes the route of packet and forces the system to invoke the L2 serving role transfer. As shown above, methods described above may be used in alternative implementations of serving role transfer and soft handoff.

Figure 9:
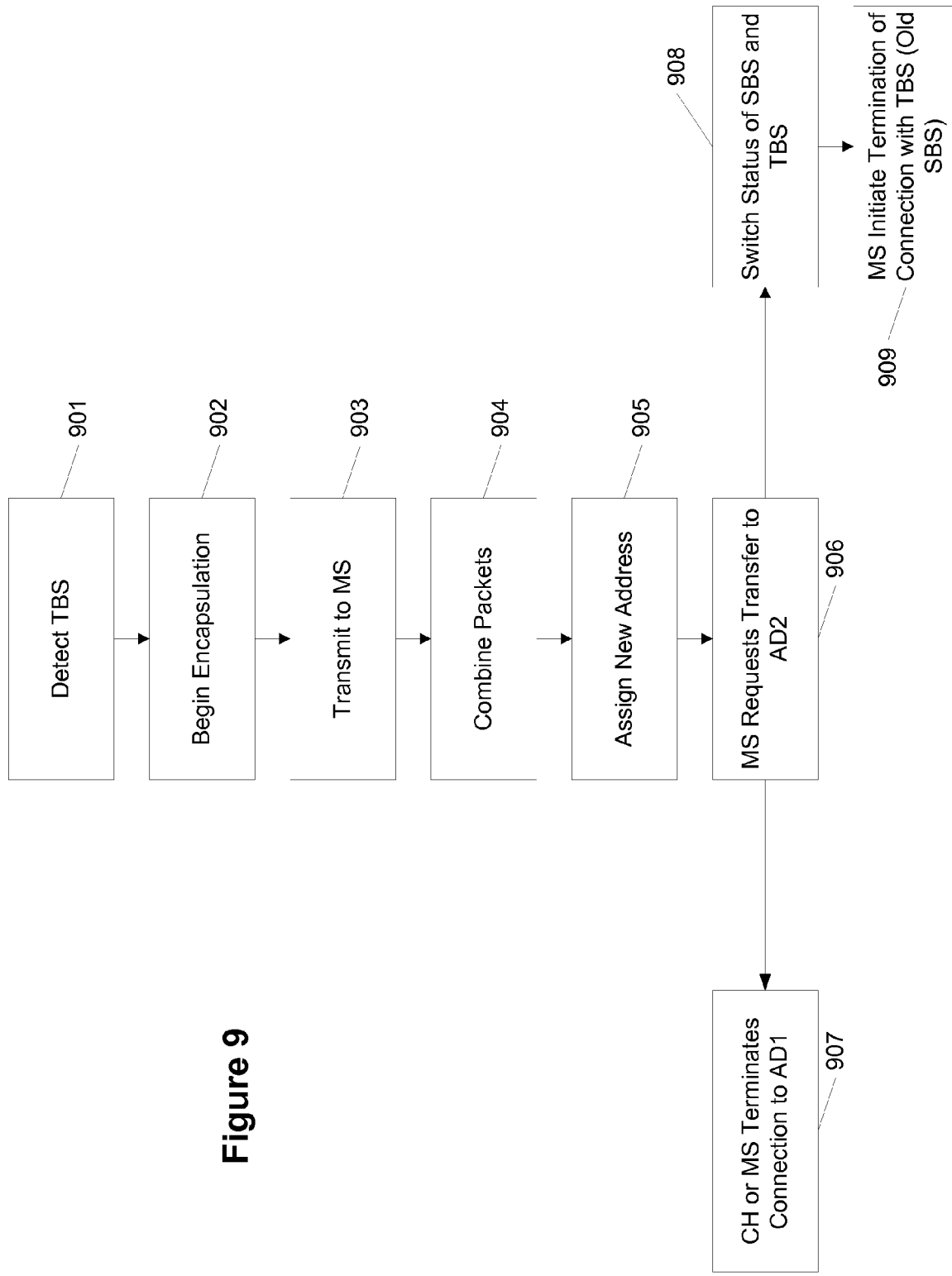
FIG. 9 shows a method for performing soft handoff between a serving base station and a target base station in accordance with embodiments of the present invention.
Figure 10:
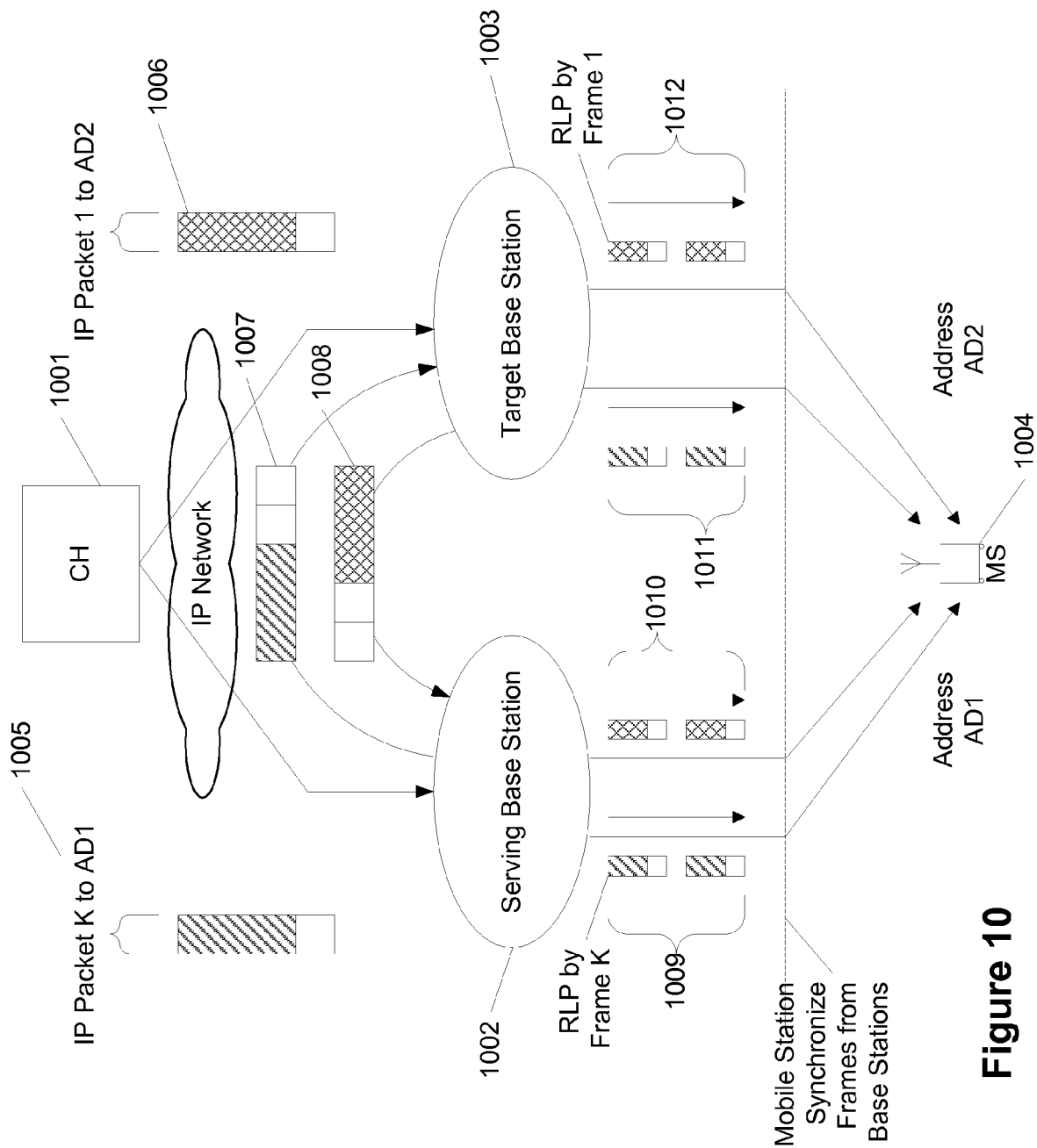
FIG. 10 shows soft handoff on layer 2 and IP layer in a CDMA system in accordance with in accordance with embodiments of the present invention.

Next, an example handoff sequence is described. FIG. 9 shows the method and FIG. 10 shows the packet and frame flows.

Prior to the method steps shown in FIG. 9, IP communication has been established between the correspondence host 1001 and the mobile station 1004 through serving base station 1002. In step 901, the mobile station 1004 detects a new BS (i.e. target BS 1003) and starts to exchange control signals with it. At the same time, the mobile station 1004 reports the target BS 1003 discovery to the serving BS 1002. The serving BS 1002 begins to setup soft handoff for the mobile station 1004 by negotiating with target BS 1003 about resources, services and so on.

Next, in step 902, the serving BS 1002 begins IP-IP encapsulation of the packet K 1005 addressed to AD1 and forwards the packet 1007 to the target BS 1003 after completing the negotiation. Target BS 1003 starts to receive the encapsulated packets. The target BS decapsulates the packet 1007 to retrieve the original packet coming from the correspondent host 1001 CH by removing the added header.

Next, in step 903, both the serving and target BSs 1002 and 1003 change the IP packets RLP PDUs 1009 and 1011, which is the frame format for the radio link. The RLP PDUs 1009 and 1011 are sent out to MS synchronously and simultaneously. This timing alignment was done during the negotiation phase.

In step 904, the mobile station 1004's radio system automatically combine the RLP PDUs 1009 and 1011 from both legs.

In step 905, the IP function in target BS 1003 begins to communicate with the mobile station 1004 and configure it by assigning new IP address AD2 relating to the target BS 1003 and its network. At this point, the mobile station 1004 has two IP address, AD1 and AD2. The target BS 1003 may set up another leg (conduit or tunnel) 1008 with serving BS 1002 to take an advantage of soft handoff communication for the new IP connection (using AD2). The mobile station receives information addressed to address AD1 through RLP PDUs 1009 and 1011 and addressed to address AD2 through RLP PDUs 1010 and 1012.

Next, in step 906, the mobile station 1004 requests the correspondent host 1001 (or other anchor point) to forward the current IP communication to the new IP address AD2. This results in the generation of IP packet 1 1006 sent to AD2. The content for the IP packet 1 1006 is generated using encapsulation for address AD2 at the correspondent host 1001.

Usually, the IP packet for the flow 1 encapsulates the IP packet destined for AD1 with the header destined for AD2 at CH. This allows for the user to continue to use existing applications without any modification, since the application program may believe that it keeps sending its data to AD1 always and not be as careful about the MS's handoff.

When the application starts IP communications, it invokes the communication program with the IP address of the destination. And the IP process and the application usually use that address as one of the parameters to relate between the communication program and the application program. Changing this IP address by the MS handoff may introduce unnecessary confusion to that relation and the application program, which is not designed to support such mid-call IP address changes. Therefore, encapsulation may be used as the solution for this. For instance, application programs generate the IP packet for AD1, which is the initial destination address, while IP process encapsulates that IP packet with AD2 which is the latest destination address. Then, the application program does not need to be as careful about the handoff of the MS.

To eliminate the packet loss or initial sustain, the correspondent host 1001 may keep sending packets to the IP address AD1 for a while. In this case both flows of IP packet k 1005 and 1 1006 use soft handoff respectively. Or when serving as an edge router, serving BS 1002 and target BS 1003 negotiate and decide that only one forwards the packet to the mobile station.

Next, either step 907 or 908 occurs. In step 907, the correspondent host 1001 or mobile station 1004 terminates the IP packet flow to AD1.

In step 908, for example if the mobile station continues to move toward the target base station 1003, the target BS 1003 becomes new serving BS for the mobile station 1004 by exchanging the serving/target roles with the old serving base station 1002. Then the IP packet forwarding through old serving BS 1002 to the mobile station 1004 (i.e. packet flow destined to AD1) is abandoned automatically.

In step 909, soft handoff is terminated when MS detects that the strength of the radio wave from the new target BS (i.e. old serving BS) falls below a threshold. The , the mobile station 1004 becomes under the threshold, MS drops the soft handoff leg with the new target BS.

Since the network layer soft handoff is independent from L2 or radio technology in principle, this independence helps makes possible smooth and disruption-less handoff between different radio technologies. For instance, the mobile station may have a CDMA system transceiver and a Bluetooth transceiver. The system may switch the route of the communication from using CDMA to using Bluetooth without any communication disruption. Usually the Bluetooth system offers more cost-effective solution by connecting to the more inexpensive Internet services than that by the CDMA system. Then the user may benefit by using this scheme when he/she is under such situation. The process for this kind of inter-radio technology handoff is similar to the example described above. But, in this case, L2 soft handoff is not applicable between those systems. It takes more time to setup the target BS since that includes initial authentication and authorization or configuration, if different radio-systems are owned by different management.

Other embodiments are possible and considered within the scope of the invention.

We claim:

1. A soft handoff system comprising a correspondent host, a first base station, a second base station, and a mobile terminal, wherein the correspondent host transmits messages to said first base station where said first base station retransmits said messages to said second base station using IP-in-IP encapsulation between said base stations, wherein said base stations encapsulate and de-encapsulate packets, wherein said mobile terminal is in an area serviceable by and receives said messages from both said first base station and said second base station, and wherein at least one of said first and second base stations is configured to determine when to initiate a soft handoff.

2. A mobile terminal configured to receive a first message from a first base station and a second message from a second base station, wherein the mobile terminal experiences soft handoff between said first and second base stations, said soft handoff using IP-in-IP encapsulation in which said first base station transmits said first message to both said mobile terminal and said second base station, and wherein said IP-in-IP encapsulation is applied to said first message toward said second base station, and wherein said second base station transmits a content included in the first message with said IP-in-IP encapsulation received from said first base station to said mobile terminal as said second message, and wherein said base stations encapsulate and de-encapsulate packets, and wherein at least one of said first and second base stations is configured to determine when to initiate said soft handoff.

3. A soft handoff system comprising:
   a correspondent host;
   a first base station that transmits packets to a mobile station;
   a second base station; and,
   said mobile station,
   wherein packets from said correspondent host are transmitted to said first base station, wherein said packets are encapsulated with a header, and sent to said second base station, and wherein said header is removed from said packet and the content of said packet is transmitted to said mobile station, said packets being transmitted from both said first base station and said second base station to said mobile terminal while experiencing soft handoff, and wherein at least one of said first and second base stations is configured to determine when to initiate said soft handoff.

4. The system according to claim 3, wherein said packets are exchanged in an IP network.

5. The system according to claim 4, wherein said IP network is part of a CDMA network.

6. The system according to claim 3, wherein a second packet from said correspondent host is transmitted to said second base station, wherein said second packet is encapsulated with a second header and sent to said first base station, and wherein said second header is removed from said second packet and the content of said second packet is transmitted to said mobile station.

7. The system according to claim 3, wherein said mobile station transmits a first data unit to said first base station and said mobile station transmits a second data unit to said second base station.

8. The system according to claim 7, wherein said second base station transmits a second packet containing content received from said mobile station to said correspondent host or to said first base station.

9. A method for performing soft handoff using IP-in-IP encapsulation between base stations, said method comprising:
   transmitting messages from a first base station to both a mobile terminal and a second base station;
   applying said IP-in-IP encapsulation to messages toward said second base station; and
   transmitting from said second base station a content of messages with IP-in-IP encapsulation received from said first base station to said mobile terminal,
   wherein said base stations are configured to encapsulate and de-encapsulate IP packets, and wherein at least one of said first and second base stations is configured to determine when to initiate said soft handoff.

10. A method for performing soft handoff using IP-in-IP encapsulation between base stations, comprising:
   receiving at a mobile terminal a first message transmitted by a first base station; and
   receiving at said mobile terminal a second message transmitted by a second base station,
   wherein said second base station generates said second message based on said first message that said second base station receives from said first base station,
   wherein said first and second base stations perform encapsulation and de-encapsulation of IP packets for transferring said messages from said first base station to said second base station, and
   wherein at least one of said first and second base stations is configured to determine when to initiate said soft handoff.

11. A method for performing soft handoff, in which a set of packets are transmitted to a mobile terminal from both a first base station and a second base station while said mobile terminal is experiencing soft handoff comprising the steps of:
   transmitting a packet from a correspondent host to said first base station;
   encapsulating said packet with a new header;
   transmitting said packet with said new header to said second base station;
   removing said new header at said second base station;
   transmitting content in said packet to said mobile station, and
   wherein at least one of said first and second base stations is configured to determine when to initiate said soft handoff.

12. The method according to claim 11, wherein said packet is routed in an IP network.

13. The method according to claim 12, wherein said IP network is a part of a CDMA network.

14. The method according to claim 11, further comprising the steps of:
   transmitting a second packet from said correspondent host to said second base station;
   adding a second header to said second packet;
   transmitting said second packet and said second header to said first base station;
   removing said second header; and
   transmitting the content contained within said second packet to said mobile station.

15. The method according to claim 11, further comprising the steps of:
   receiving a first data unit transmitted from said mobile station at said first base station; and
   receiving a second data unit from said mobile station at said second base station.

16. The method according to claim 15, further comprising the steps of:
   receiving a second packet containing content received from said mobile station at said correspondent host or to said first base station.

17. A method for a mobile station to experience soft handoff between base stations using IP-in-IP encapsulation, comprising:
   transmitting from a first base station a packet to said mobile station;
   encapsulating a content included in said packet at said first base station;
   transmitting said encapsulated content from said first base station to a second base station,
   wherein said second base station is configured to transmit said content included in said encapsulated content to said mobile station during soft hand off, and
   wherein at least one of said first and second base stations is configured to determine when to initiate said soft handoff.

18. A method for performing soft handoff for a mobile station in which packets are transferred with both a first base station and a second base station when a mobile terminal is in an area serviceable by both said first base station and said second base station, said method comprising:
   transmitting a packet from a correspondent host to said first base station,
   encapsulating at said first base station content in said packet with a new header,
   transmitting said content with said new header from said first base station to said second base station,
   removing said new header at said second base station,
   transmitting said content from said first base station to said mobile station, and
   transmitting said content from said second base station to said mobile station,
   wherein at least one of said first and second base stations is configured to determine when to initiate said soft handoff.

19. The method according to claim 18, wherein said packet is routed in an IP network.

20. The method according to claim 19, wherein said IP network is a part of a CDMA network.

21. The method according to claim 18, further comprising the steps of:
   transmitting a first data unit from said mobile station to said first base station; and
   transmitting a second data unit from said mobile station to said second base station.

22. The method according to claim 18, further comprising the steps of:
   transmitting a second packet containing content received from said mobile station to said correspondent host or to said first base station.

23. The system according to claim 3, said first base station further comprising:
   an output through which said packets received from said correspondent host are transmitted to said mobile station, such that said mobile station receives packets from said first base station and said second base station,
   wherein said first base station and said second base station both transmitting said packets from said correspondent host results in soft-handoff between said first base station and said second base station.

24. The method according to claim 11, further comprising the step of:
   transmitting from said first base station to said mobile terminal said packet from said correspondent host,
   wherein said first base station and said second base station both transmitting said packets from said correspondent host results in soft-handoff between said first base station and said second base station.

25. The method according to claim 18, further comprising the step of:
   receiving a third packet at said mobile station, said third packet having been transmitted from said first base station, said first base station having received said third packet encapsulated by a third header, said third header having been added by said second base station.

26. The soft handoff system according to claim 3, wherein a network management system monitors a delay between said messages.

27. The mobile terminal according to claim 2, wherein the transmission from said first base station to said mobile terminal and the transmission from said second base station to said mobile terminal occur simultaneously.

28. The soft handoff system according to claim 3, wherein said encapsulation header includes an option field that specifies a time for said second base station to transmit said packets to said mobile terminal.

29. The method according to claim 9, said mobile terminal monitoring a delay between reception of messages originating from said first base station and said second base station and reporting said delay to at least one of said base stations.

30. The method according to claim 9, wherein said base stations transmit said messages to said mobile terminal simultaneously.

31. The method according to claim 11, wherein said new header includes a field specifying a time for said second base station to transmit said packet.

32. The method according to claim 9, wherein the encapsulation includes a field specifying a time for the second base station to transmit packets to the mobile terminal.

33. The method according to claim 18, wherein said receiving step receives said content from both said first base station and said second base station simultaneously.

* * * * *